United States Patent
Heo et al.

(10) Patent No.: US 9,067,230 B2
(45) Date of Patent: Jun. 30, 2015

(54) COATING APPARATUS AND METHOD FOR COATING USING THE SAME

(75) Inventors: Kyoung-Heon Heo, Yongin-si (KR); Jee-Sang Hwang, Yongin-si (KR); Gi-Sung Kim, Yongin-si (KR); Won-Sub Seo, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 618 days.

(21) Appl. No.: 13/188,780

(22) Filed: Jul. 22, 2011

(65) Prior Publication Data
US 2012/0148727 A1    Jun. 14, 2012

(30) Foreign Application Priority Data
Dec. 13, 2010   (KR) .......................... 10-2010-0126938

(51) Int. Cl.
*B05C 5/02*    (2006.01)
*B29C 47/00*    (2006.01)
*B29C 47/16*    (2006.01)

(52) U.S. Cl.
CPC ........... *B05C 5/0262* (2013.01); *B29C 47/0021* (2013.01); *B05C 5/0283* (2013.01); *B29C 47/165* (2013.01); *B29C 47/0019* (2013.01)

(58) Field of Classification Search
CPC .. B05C 5/0262; B05C 5/0283; B29C 47/165; B29C 47/0021; B29C 47/0019
USPC ............. 118/410, 419; 425/133.5, 382.4, 141
See application file for complete search history.

(56) References Cited

U.S. PATENT DOCUMENTS

| | | | | |
|---|---|---|---|---|
| 3,940,221 A | * | 2/1976 | Nissel | 425/141 |
| 4,382,766 A | * | 5/1983 | Feuerherm | 425/465 |
| 4,990,078 A | * | 2/1991 | Tomita | 425/141 |
| 5,208,047 A | | 5/1993 | Cloeren et al. | |
| 6,019,924 A | | 2/2000 | Montalbano | |
| 6,126,751 A | * | 10/2000 | Bernert et al. | 118/410 |
| 6,344,088 B1 | * | 2/2002 | Kamikihara et al. | 118/712 |
| 7,622,004 B2 | * | 11/2009 | Kawatake et al. | 118/410 |

(Continued)

FOREIGN PATENT DOCUMENTS

| | | |
|---|---|---|
| JP | 08-038975 | 2/1996 |
| JP | 2000-505367 | 5/2000 |

(Continued)

OTHER PUBLICATIONS

Korean Notice of Allowance issued on Mar. 22, 2013 of the Korean Patent Application No. 10-2010-0126938. With its English translation.

(Continued)

*Primary Examiner* — Laura Edwards
(74) *Attorney, Agent, or Firm* — Robert E. Bushnell, Esq.

(57) ABSTRACT

A coating apparatus to apply a coating solution onto a base material, including a first body portion, a second body portion spaced-apart by a gap from the first body portion, a coating solution inlet arranged in one region of the second body portion, a coating solution passage connecting the coating solution inlet to said gap, a coating solution outlet arranged at one end of the gap to discharge the coating solution supplied to the coating solution inlet and a gap adjusting arrangement including a plurality of gap adjusting portions arranged on the first body portion to adjust a size of the coating solution outlet, the plurality of gap adjusting portions being arranged in a width direction of the base material.

13 Claims, 4 Drawing Sheets

(56) References Cited

U.S. PATENT DOCUMENTS

| | | | |
|---|---|---|---|
| 8,117,983 B2 * | 2/2012 | Fork et al. | 118/410 |
| 8,347,809 B2 * | 1/2013 | Takahashi et al. | 118/300 |

FOREIGN PATENT DOCUMENTS

| | | |
|---|---|---|
| JP | 3369910 | 11/2002 |
| JP | 2003-93944 | 4/2003 |
| JP | 2004-113960 | 4/2004 |
| JP | 2006-346649 | 12/2006 |
| JP | 2011-062684 | 3/2011 |
| KR | 10-2009-0080361 | 7/2009 |
| KR | 101000874 | 12/2010 |
| WO | 97/27990 | 8/1997 |

OTHER PUBLICATIONS

Korean Office Action issued on Aug. 29, 2012 of the Korean Patent Application No. 10-2010-0126938. With its English translation.

* cited by examiner

COATING APPARATUS AND METHOD FOR COATING USING THE SAME

CLAIM OF PRIORITY

This application makes reference to, incorporates the same herein, and claims all benefits accruing under 35 U.S.C. §119 from an application for COATING APPARATUS AND METHOD FOR COATING USING THE SAME earlier filed in the Korean Intellectual Priority Office on 13 Dec. 2010 and there duly assigned Serial No. 10-2010-0126938.

BACKGROUND OF THE INVENTION

1. Field of the Invention

An aspect of the present invention relates to a coating apparatus and a method for coating using the same, which can maintain a coating thickness with equal quality.

2. Description of the Related Art

In general, a coating apparatus is assembled with a gap of a predetermined thickness, formed in the middle thereof. Here, the gap is a space through which a coating solution emerges from the coating apparatus. When coating is performed on a coating object by using the coating apparatus, the gap is adjusted to control the thickness of the coating.

First, there is a method for adjusting a gap in a coating apparatus using a bolt and a nut. In this method, the gap is adjusted according to the pitch of the bolt, but it is difficult to perform minute adjustments. Further, since the bolt itself receives a reaction force applied thereto, the gap is not adjusted as necessary when the bolt is rotated. In addition, when a forward mode is changed into a backward mode or when the backward mode is changed into the forward mode, a backlash phenomenon occurs.

Since it is difficult to adjust the gap at ordinary times in the coating apparatus using the bolt and the nut, the method is practically used to perform initial setting. If the gap is continuously adjusted by using the bolt and the nut, damage occurs due to the friction between the bolt and the nut.

Next, there is a method for adjusting a gap in a coating apparatus using expansion and contraction of metal due to temperature changes. However, this method is complicated and has low response speed. Further, the expansion and contraction of metal due to temperature changes are influenced by the limited range of temperature. As a result, there is a need for a practical design for a coating apparatus that allows for adjustments to the gap while the coating apparatus is in use to provide a coating having uniform characteristics.

SUMMARY OF THE INVENTION

Embodiments provide a coating apparatus and a method for coating using the same, which can automatically/manually control the thickness of coating by using an air pressure controller when the coating is performed on a coating object.

According to an aspect of the present invention, there is provided a coating apparatus including a first body portion, a second body portion spaced-apart by a gap from the first body portion, a coating solution inlet arranged in one region of the second body portion, a coating solution passage connecting the coating solution inlet to said gap, a coating solution outlet arranged at one end of the gap to discharge the coating solution supplied to the coating solution inlet and a gap adjusting arrangement including a plurality of gap adjusting portions arranged on the first body portion to adjust a size of the coating solution outlet, the plurality of gap adjusting portions being arranged in a width direction of the base material.

Each of the first and second body portions may include an inclined surface that narrows toward the coating solution outlet. The first body portion may further include a concave portion extending in the width direction of the base material from one region of the inclined surface of the first body portion to the coating solution outlet. The coating apparatus may also include a protruding portion arranged at the concave portion along the width direction of the base material and a plurality of grooves arranged at intervals at an end portion of the protruding portion. The gap adjusting portion may include an air pressure cylinder that includes a moving member having one end inserted into one of the grooves of the protruding portion, the moving member may move in accordance to an air pressure supplied to the air pressure cylinder. The air pressure cylinder may also include a forward air pressure controller and a backward air pressure controller. The coating apparatus may also include an air pressure controller and a switching valve to control forward and backward movements of the moving member of the air pressure cylinder.

A side of the coating solution outlet in the first body portion may include a material having elasticity. The coating apparatus may also include a coating thickness sensing portion arranged on a side of the coating apparatus opposite from that of the gap adjusting arrangement. The coating apparatus may also include a coating solution supply portion arranged at an outside of the coating solution inlet to supply the coating solution to the coating solution inlet. The coating apparatus may also include a spacer arranged within a portion of the gap between the first and second body portions opposite the coating solution outlet.

According to another aspect of the present invention, there is provided a method of coating a coating solution to a base material using a coating apparatus, the method including supplying the coating solution to a coating solution inlet of the coating apparatus, coating the coating solution onto the base material by discharging the coating solution from a coating solution outlet of the coating apparatus, determining whether a coating thickness of the coating solution on the base material is uniform by measuring the coating thickness using a coating thickness sensing portion of the coating apparatus and controlling a rate of discharge of the coating solution ejected from the coating solution outlet by changing a size of the coating solution outlet via a gap adjusting portion of the coating apparatus upon the coating thickness being determined to be non-uniform.

The controlling the rate of the coating solution discharged from the coating apparatus may include narrowing a size of the coating solution outlet in a region of the coating apparatus by moving a moving member of the gap adjusting portion forward upon determination that said coating thickness on a corresponding region of said base material is thicker than that of other regions. The controlling the rate of discharge of the coating solution ejected may instead include widening a size of the coating solution outlet in a region of the coating apparatus by moving a moving member of the gap adjusting portion backward upon determination that said coating thickness on a corresponding region of said base material is thinner than that of other regions. In the controlling of the rate of discharge of the coating solution ejected from the coating apparatus, a moving member of the gap adjusting portion may be moved forward or backward by forward and backward by a plurality of air pressure controllers respectively. In the controlling of the rate of discharge of the coating solution ejected from the coating apparatus, a moving member of the gap adjusting portion may be moved forward or backward by an air pressure controller and a switching valve. The gap adjusting portion may include an oil pressure cylinder that may include a moving member that may vary a size of an opening of the coating solution outlet by moving either forward or backward a moving member which pushes on or releases a force to or from an elastic sidewall of the coating solution outlet by varying an amount of pressure applied to the oil pressure cylinder.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. In the drawings, the thickness or size of layers are exaggerated for clarity and not necessarily drawn to scale.

Figure 1:
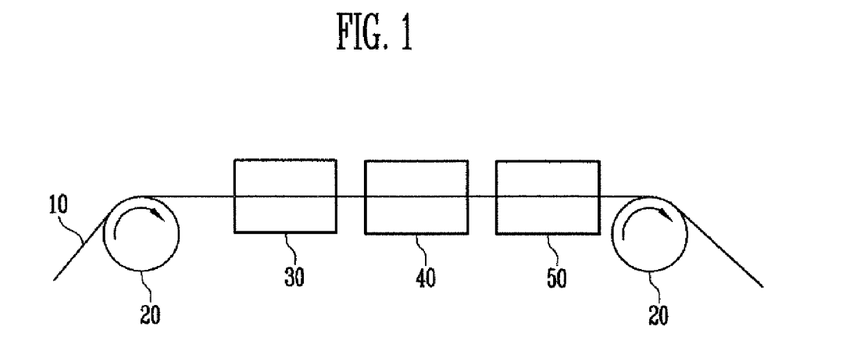
FIG. 1 is a schematic view illustrating a process for preparing a base material by using a coating apparatus according to the present invention.

Turning now to FIG. 1, FIG. 1 is a schematic view illustrating a process for preparing a base material by using a coating apparatus according to the present invention. Referring to FIG. 1, a base material wound around rolls 20 at both sides is provided to be continuously transferred, and a coating apparatus 30, a drying apparatus 40 and a slitting apparatus 50 are sequentially provided at the top side of the base material. The coating apparatus 30 according to the present invention may be used in a variety of fields, however a coating apparatus to coat an active material slurry on a metallic material of a secondary battery will be described in the following embodiments.

First, a binder solution is made by mixing a binder and a solvent together. An active material and a conducting agent or additive is then mixed with the binder solution, thereby preparing an active material slurry. Subsequently, the active material slurry is coated on a metallic material that is a collector by using the coating apparatus 30, and then dried using the drying apparatus 40. Subsequently, rolling is performed to increase the capacity density of the active material, and slitting is then performed using the slitting apparatus 50, thereby obtaining an electrode plate with a constant width.

Here, the active material slurry is in a state that it contains the solvent, and the active material is in a state that the solvent is removed by drying the active material slurry.

Figure 2:
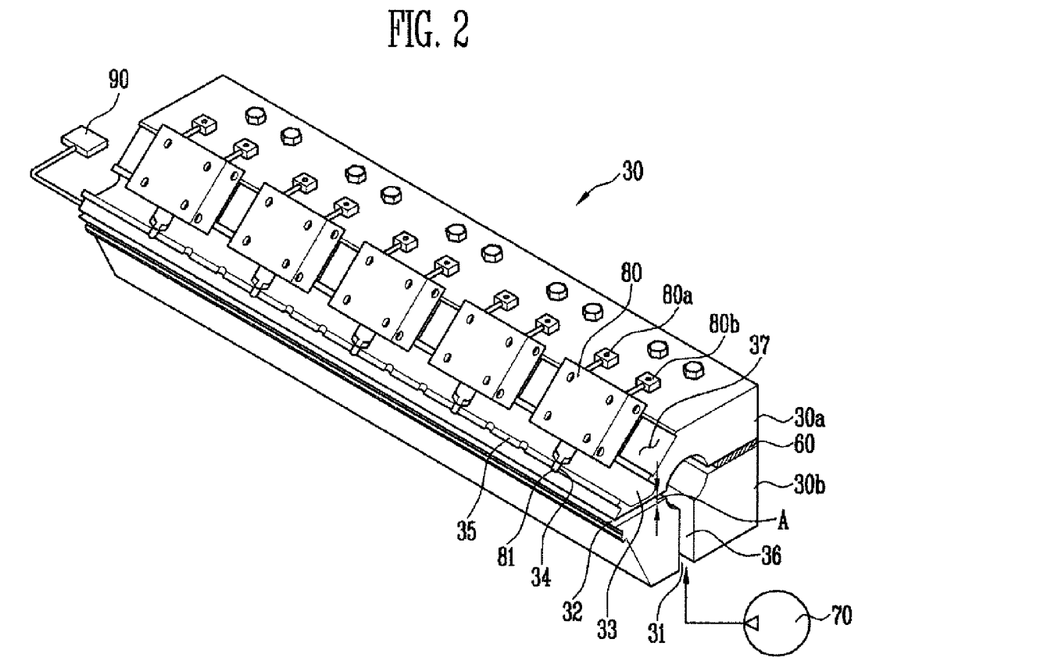
FIG. 2 is a perspective view of a coating apparatus according to an embodiment of the present invention.

Turning now to FIG. 2, FIG. 2 is a perspective view of a coating apparatus according to an embodiment of the present invention. Referring to FIG. 2, the coating apparatus 30 according to this embodiment includes a first body portion 30a, a second body portion 30b, a coating solution inlet 31, a coating solution outlet 32 and a gap adjusting portion 80.

The first and second body portions 30a and 30b are assembled with a predetermined gap A interposed therebetween. The gap A may be formed by a spacer 60 positioned between the first and second body portions 30a and 30b. That is, the gap A between the first and second body portions 30a and 30b is primarily determined by the spacer 60, and may be adjusted by the gap adjusting portion 80 which will be described later. Here, the spacer 60 may be positioned at the top side of the gap A between the first and second body portions 30a and 30b.

One side of the gap A between the first and second body portions 30a and 30b may be used as the coating solution outlet 32. The coating solution inlet 31 is formed in one region of the second body portion 30b. The coating solution inlet 31 may be extended to a coating solution passage 36 passed though up to the gap A. A coating solution supply portion 70 to supply a coating solution may be further formed at an outside of the coating solution inlet 31.

Accordingly, if the coating solution supplied from the coating solution supply portion 70 is injected through the coating solution inlet 31, the injected coating solution moves along the coating solution passage 36 passed through up to the gap A. Then, the coating solution is jetted through the one side of the gap A between the first and second body portions 30a and 30b, i.e., through the coating solution outlet 32. Since the size of the gap A is identical to that of the coating solution outlet 32, the thickness of the coating solution coated on a base material (not shown) is also determined accordingly.

In this instance, an inclined surface 37 narrowed toward the gap A may be formed at the side of the coating solution outlet 32 in each of the first and second body portions 30a and 30b. A concave portion 33 is formed along the width direction of the base material (not shown) from one region of the inclined surface 37 to the coating solution outlet 32.

The side of the coating solution outlet 32 in the first body portion 30a is narrowed by the concave portion 33, and may be made out of a material with elasticity, such as rubber or urethane rubber. A protruding portion 35 is formed along the width direction of the base material at the concave portion 33, and grooves 34 may be formed at a predetermined interval at an end portion of the protruding portion 35.

The gap adjusting portion 80 may have a plurality of gap adjusting portions provided in the width direction of the base material on the inclined surface 37 of the first body portion 30a. Here, the gap adjusting portion 80 may be an air pressure cylinder that includes a forward air pressure cylinder 80a and a backward air pressure cylinder 80b. Accordingly, the forward and backward movements of a moving member 81 in the air pressure cylinder 80 can be selectively controlled according to the control of air pressure.

In this instance, one side of the moving member 81 in the air pressure cylinder 80 is inserted into the groove 34 of the protruding portion 35, so that the protruding portion 35 moves according to the forward/backward movement of the air pressure cylinder 80, and thus the size of the coating solution outlet 32 can be adjusted.

Here, the air pressure controllers 80a and 80b are apparatuses that regulate the pressure of air supplied to air pressure cylinder 80. The air pressure controllers 80a and 80b are supplied with a high air pressure and output a desired and lower air pressure and supply the lower and desired air pressure to the air pressure cylinder 80. Accordingly, the air pressure controllers 80a and 80b control the operational force of the air pressure cylinder 80, and thus the size of the coating solution outlet 32 can be adjusted by the operational force.

The forward and backward air pressure controllers 80a and 80b may be operated in an automatic or manual mode. In a case where the forward and backward air pressure controllers 80a and 80b are operated in the automatic mode, they measure the thickness of the coating solution and then automatically adjust the coating thickness when it is unequal, so that coating can be more rapidly performed.

As described above, the size of the coating solution outlet 32 is changed to adjust the thickness of the coating solution coated on the base material by controlling the amount of the jetted coating solution. In the coating apparatus 30 of the present invention, a coating thickness sensing portion 90 may be further formed at the rear of the coating solution outlet 32 formed in the movement direction of the base material. In a case where the thickness of the coating solution is unequal, the coating thickness sensing portion 90 allows the air pressure cylinder 80 at a corresponding position to be operated, so that the thickness of the coating solution can be equally maintained.

Figure 3:
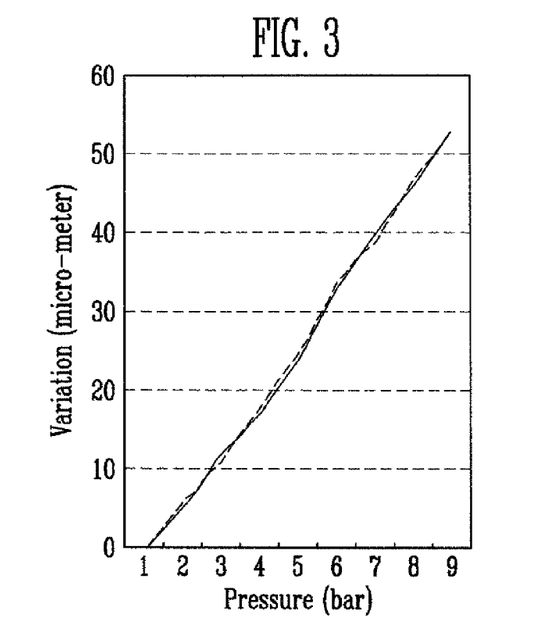
FIG. 3 is a graph showing variations of a coating gap with respect to pressures applied to an air cylinder.

Turning now to FIG. 3, FIG. 3 is a graph showing variations of a coating gap A with respect to pressures applied to an air cylinder. Referring to FIGS. 2 and 3, the gap A of the coating apparatus 30 may be adjusted by controlling the side of the coating solution outlet 32 in the first body portion 30a of the coating apparatus 30, made out of a metallic material, using the air pressure cylinder 80 within the elastic limit range of the coating apparatus 30. In this instance, the size of the gap A of the coating apparatus 30 is essentially linear with respect to pressure and is thus in proportion to the pressure of the air pressure cylinder 80. Thus, the size of the gap A of the coating apparatus 30 can be determined from the pressure applied to the air pressure cylinder 80 by using the proportion relation.

Hereinafter, a measuring method of a variation in the gap A of the coating apparatus 30 using the internal pressure of the air pressure cylinder 80 will now be described.

$\sigma = E \times \epsilon$ [$\sigma$: stress, E: elastic modulus, $\epsilon$: deformation ratio]

$F = K \times x$ [F: force, K: spring modulus, x: extended length of spring]

$\therefore F = \sigma$ [since the force and the stress have the same system unit, a variation in the gap of the coating apparatus may be expressed using an extended length]

$\therefore F = P \times A$ [F: operational force of air pressure cylinder, P: internal pressure of air pressure cylinder, A: internal area of air pressure cylinder]

$\therefore K \times x = P \times A \rightarrow x = (P \times A)/K$

As can be seen through the measuring method described above, the size of the gap A of the coating apparatus 30 is in proportion to the internal pressure of the air pressure cylinder 80. That is, it can be seen that as the internal pressure of the air pressure cylinder 80 is increased, the size of the gap A is also increased within the elastic limit range of the coating apparatus 30.

Figure 4:
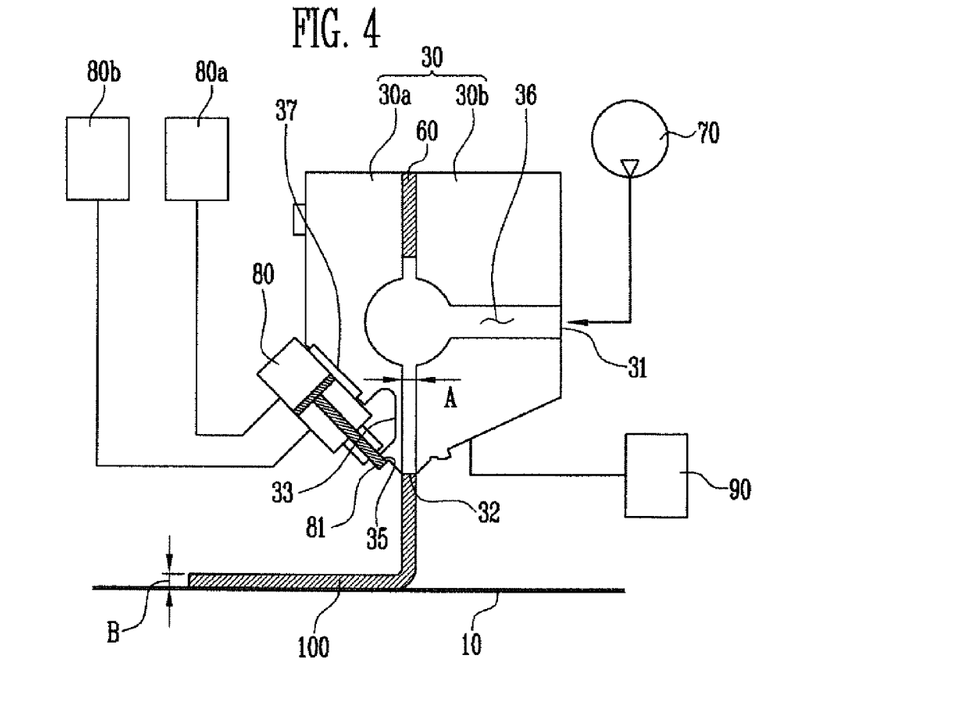
FIG. 4 is a sectional view showing a forward state of an air cylinder mounted to the coating apparatus according to the embodiment of the present invention.
Figure 5:
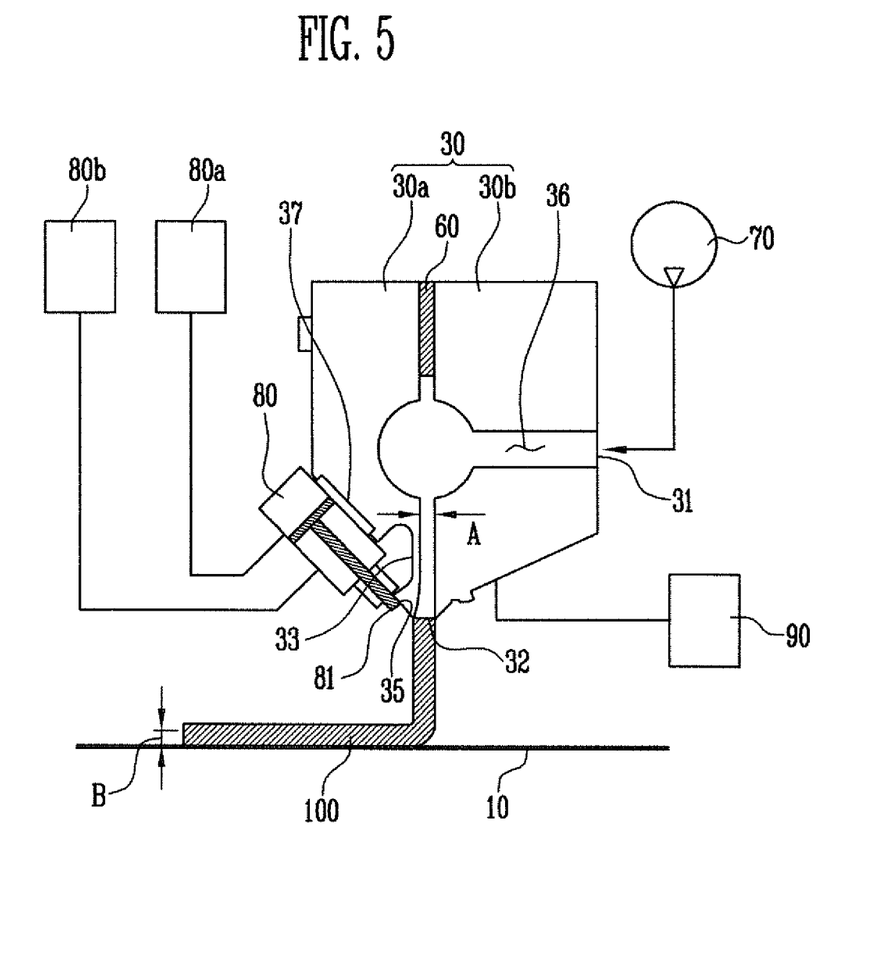
FIG. 5 is a sectional view showing a backward state of the air cylinder mounted to the coating apparatus according to the embodiment of the present invention.

Turning now to FIGS. 4 and 5, FIG. 4 is a sectional view showing a forward state of the air cylinder mounted to the coating apparatus according to the embodiment of the present invention and FIG. 5 is a sectional view showing a backward state of the air cylinder mounted to the coating apparatus according to the embodiment of the present invention.

Referring to FIGS. 4 and 5, the coating apparatus is used when a coating solution 100 is coated on a base material 10. The coating solution 100 is supplied to the coating solution inlet 31 by using the coating solution supply portion 70, preferably a coating solution pump. The supplied coating solution 100 is jetted through the coating solution outlet 32 by passing through the coating solution passage 36 and moving to one side of the gap A between the first and second body portions 30a and 30b. In this instance, the initial gap A of the coating apparatus 30 is determined by the spacer 60. The thickness B of the coating solution 100 coated on the base material 10 is determined depending on the size of the gap A. Accordingly, the coating solution 100 with the equal thickness B is coated on the base material 10.

However, the equal thickness B of the coating solution 100 cannot be maintained due to the limit of processing accuracy and the change in material properties of the coating solution 100. Therefore, the thickness B of the coating solution B is controlled by adjusting the size of the gap A. In this instance, the size of the gap A may be adjusted using the air pressure cylinder 80 provided in the first body portion 30a of the coating apparatus 30. The forward air pressure controller 80a and the backward air pressure controller 80b may be individually formed in the air pressure cylinder 80. Accordingly, the thickness B of the coating solution 100 can be controlled by adjusting the size of the gap A to be wide or narrow.

A plurality of air pressure cylinders 80 may be provided in a direction perpendicular to the coating direction, i.e., in the width direction of the base material 10 to adjust the size of gap A at various points along the coating apparatus 30. In this instance, a plurality of grooves 34 are formed at the end portion of the protruding portion 35 of the first body portion 30a, and therefore, the location of the air pressure cylinders 80 may be changed. Accordingly, the thickness of the coating solution 100 in the coating width direction can be controlled by partially adjusting the gap A of the coating apparatus 30 in the width direction of the base material 10.

Here, the coating apparatus 30 is further provided with the coating thickness sensing portion 90, so that when a non-uniform thickness B of the coating solution 100 is sensed, one or more of the air pressure cylinders 80 can be operated. In a case where it is determined that the thickness B is thicker than those of other regions, the moving member 81 of the air pressure cylinder 80 moves forward so that the size of gap A and thus the size of coating solution outlet 32 is narrowed. Thus, the amount of the jetted coating solution 100 can be decreased.

In a case where it is determined that the thickness B is thinner than those of other regions, the moving member 81 of the air pressure cylinder 80 of the thin region moves backward so that the size of the coating solution outlet 32 is widened. Thus, the amount of the jetted coating solution 100 can be increased. Accordingly, it is possible to form the coating having a thickness B equal to those of other regions.

That is, in the forward movement, the moving member 81 inserted in the groove 34 of the protruding portion 35 moves forward, so that the size of the coating solution outlet 32 is narrowed. In the backward movement, the moving member 81 moves backward and pulls the first body portion 30a at the side of the coating solution outlet 32, so that the size of the coating solution outlet 32 is widened. Here, the forward and backward movements of the air pressure cylinder 80 are performed by the forward and backward air pressure controllers 80a and 80b, respectively. The forward and backward air pressure controllers 80a and 80b may be operated in an automatic or manual mode.

Figure 6:
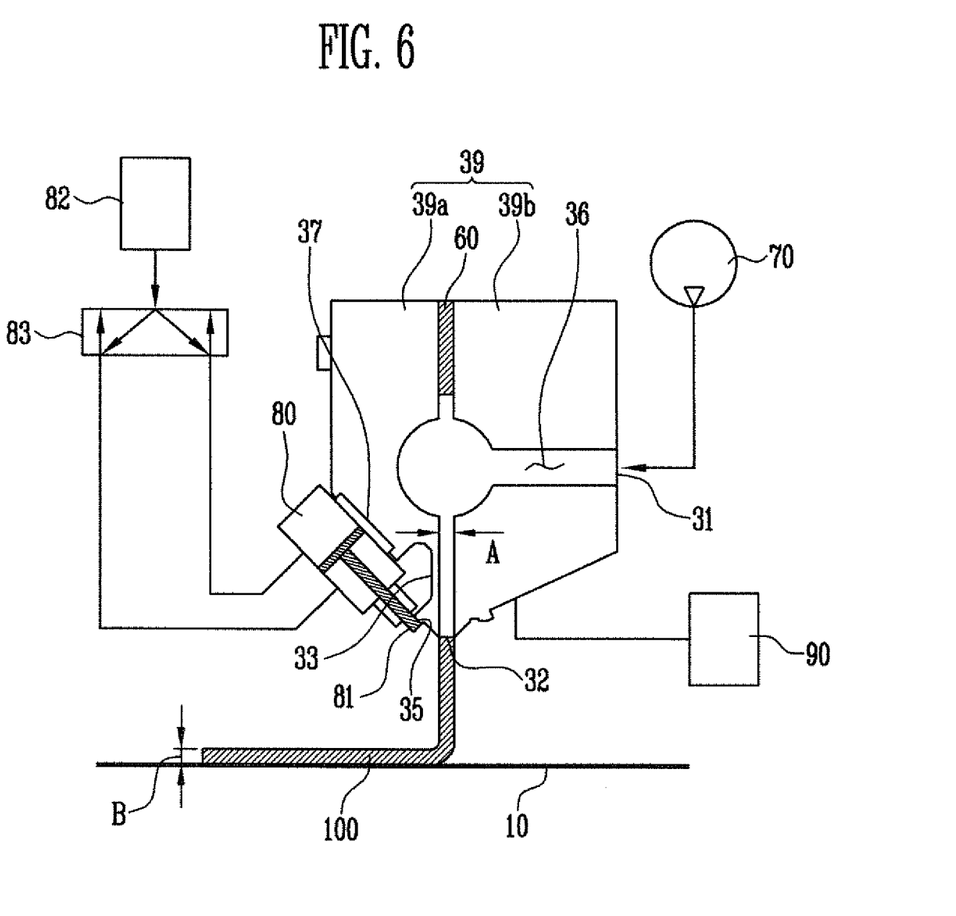
FIG. 6 is a sectional view showing a state that coating is performed on a coating object by using a coating apparatus according to another embodiment of the present invention.

Turning now to FIG. 6, FIG. 6 is a sectional view showing a state that coating is performed on a coating object by using a coating apparatus 39 according to a second embodiment of the present invention. As in the first embodiment, coating apparatus 39 according to the second embodiment has a first body portion 39a and a second body portion 39b. However, instead of using air pressure controllers 80a and 80b to control the air pressure cylinder 80 as in the first embodiment, the first body portion 39a of coating apparatus 39 of the second embodiment of FIG. 6 includes one air pressure controller 82 and an air pressure valve 83 to control air pressure cylinder 80. The air pressure switching valve 83 may be a 3-way air pressure switching valve, and can control an operational direction of the air pressure cylinder 80. That is, the air pressure switching valve 83 can control a forward/backward direction of the air pressure cylinder 80. Here, the air pressure controller 82 and the air pressure switching valve 83 may be operated in an automatic or manual mode.

Hereinafter, a method for adjusting a coating thickness using the coating apparatus according to the present invention will be described.

In the method for adjusting the coating thickness B using the coating apparatus 30 according to the present invention, the coating solution 100 is first supplied to the coating solution inlet 31. Then, the coating solution 100 is jetted through the coating solution outlet 32 by passing through the coating solution passage 36. The coating solution 100 jetted through the coating solution outlet 32 is coated on the transferred base material 10. In this instance, the coating thickness sensing portion 90 determines whether the coating thickness B is uniform or non-uniform by measuring the coating thickness B. Here, if it is determined that the coating thickness B is not uniform, the coating solution outlet 32 is narrowed or widened to vary the coating solution outlet so that the coating thickness becomes uniform.

In a case where it is determined that the coating thickness B is thicker than those of other regions, the moving member 81 of the air pressure cylinder 80 moves forward, so that the size of the coating solution outlet 32 can be reduced. In a case where it is determined that the coating thickness B is thinner than those of other regions, the moving member 81 of the air pressure cylinder 80 moves backward, so that the size of the coating solution outlet 32 can be increased.

In this instance, the forward and backward movements of the air pressure cylinder 80 may be controlled by the forward and backward air pressure controllers 80a and 80b, respectively. Alternatively, the forward and backward movements of the air pressure cylinder 80 may be controlled by the air pressure controller 82 and the air pressure switching valve 83 to control the forward/backward movement of the air pressure cylinder 80.

As described above, according to embodiments of the present invention, in a case where the thickness of the coating solution is unequal due to the limit of processing accuracy in the coating apparatus and the change in material properties of the coating solution, the gap at a portion of the coating apparatus can be adjusted using the air pressure cylinder. Accordingly, it is possible to maintain the uniform thickness of the coating solution.

Although an apparatus for coating an active material layer on an electrode plate of a secondary battery has been described in the aforementioned embodiments, the present invention may be applied to apparatuses for coating any coating solution on other base materials. In addition, the present invention is not limited to the use of an air pressure cylinder to vary the size of the gap through which a solution passes, as an oil pressure cylinder may instead be used to vary the gap size and still be within the scope of the present invention.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A coating apparatus to apply a coating solution onto a base material, comprising:
    a first body portion;
    a second body portion spaced-apart by a gap from the first body portion;
    a coating solution inlet arranged in one region of the second body portion;
    a coating solution passage connecting the coating solution inlet to said gap;
    a coating solution outlet arranged at one end of the gap to discharge the coating solution supplied to the coating solution inlet;
    a plurality of air pressure cylinders arranged on the first body portion and in a width direction of the base material, each of the air pressure cylinders including a moving member, each of the air pressure cylinders to adjust a size of the coating solution outlet by adjusting a width of the gap in a width direction of the base material by forward and backward movements of the moving member;
    an air pressure controller and a switching valve to control the forward and the backward movements of the moving member of one of the air pressure cylinders.

2. The coating apparatus of claim 1, wherein each of the first and second body portions comprise an inclined surface that narrows toward the coating solution outlet.

3. The coating apparatus of claim 2, wherein the first body portion further comprises a concave portion extending in the width direction of the base material from one region of the inclined surface of the first body portion to the coating solution outlet.

4. The coating apparatus of claim 3, further comprising:
    a protruding portion arranged at the concave portion along the width direction of the base material; and
    a plurality of grooves arranged at intervals at an end portion of the protruding portion.

5. The coating apparatus of claim 4, wherein one end of the moving member of each of the air pressure cylinders is inserted into a corresponding one of the grooves of the protruding portion and moves in accordance to an air pressure supplied to the air pressure cylinder.

6. The coating apparatus of claim 1, wherein the first body, in a vicinity of the coating solution outlet, is comprised of a material having elasticity.

7. The coating apparatus of claim 1, further comprising a coating thickness sensing portion arranged on a side of the coating apparatus opposite from that of the plurality of air pressure cylinders, the coating thickness sensing portion to sense whether the coating thickness is uniform or non-uniform.

8. The coating apparatus of claim 1, further comprising a coating solution supply portion arranged at an outside of the coating solution inlet to supply the coating solution to the coating solution inlet.

9. The coating apparatus of claim 1, further comprising a spacer arranged within a portion of the gap between the first and second body portions opposite the coating solution outlet, wherein a size of the gap is primarily determined by the spacer, and may be adjusted by at least one of the air pressure cylinders.

10. The coating apparatus of claim 1, the air pressure controller is supplied with a high air pressure and outputs a desired and lower air pressure and supplies the lower and desired air pressure to the one of the air pressure cylinders.

11. A coating apparatus to apply a coating solution onto a base material, comprising:
   a first body portion;
   a second body portion spaced-apart by a gap from the first body portion;
   a coating solution inlet arranged in one region of the second body portion;
   a coating solution passage connecting the coating solution inlet to said gap;
   a coating solution outlet arranged at one end of the gap to discharge the coating solution supplied to the coating solution inlet; and
   a plurality of air pressure cylinders arranged on the first body portion and in a width direction of the base material to adjust a size of the coating solution outlet by adjusting a width of the gap in a width direction of the base material, wherein each air pressure cylinder comprises a forward air pressure controller and a backward air pressure controller individually formed in each air pressure cylinder.

12. The coating apparatus of claim 11, the forward air pressure controller to control a forward movement of the air pressure cylinder and the backward air pressure controller to control a backward movement of the air pressure cylinder.

13. The coating apparatus of claim 11, the forward and backward air pressure controllers are supplied with a high air pressure and output a desired and lower air pressure and supply the lower and desired air pressure to the air pressure cylinder.

* * * * *